April 21, 1953     L. L. PATTERSON     2,635,516

PATH-LEVELING MEANS FOR THE WHEELS OF WHEEL-MOUNTED PLOWS

Filed Nov. 19, 1946     2 SHEETS—SHEET 1

Louis L. Patterson,
INVENTOR.

BY
ATTORNEY.

April 21, 1953            L. L. PATTERSON            2,635,516
PATH-LEVELING MEANS FOR THE WHEELS OF WHEEL-MOUNTED PLOWS
Filed Nov. 19, 1946
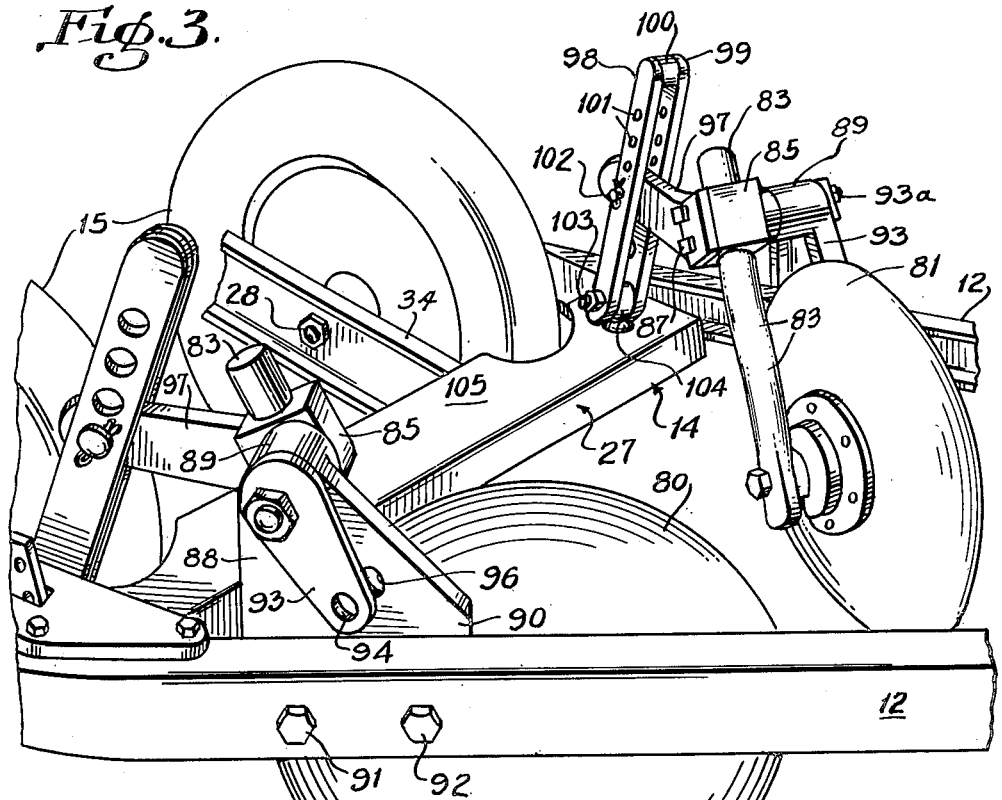
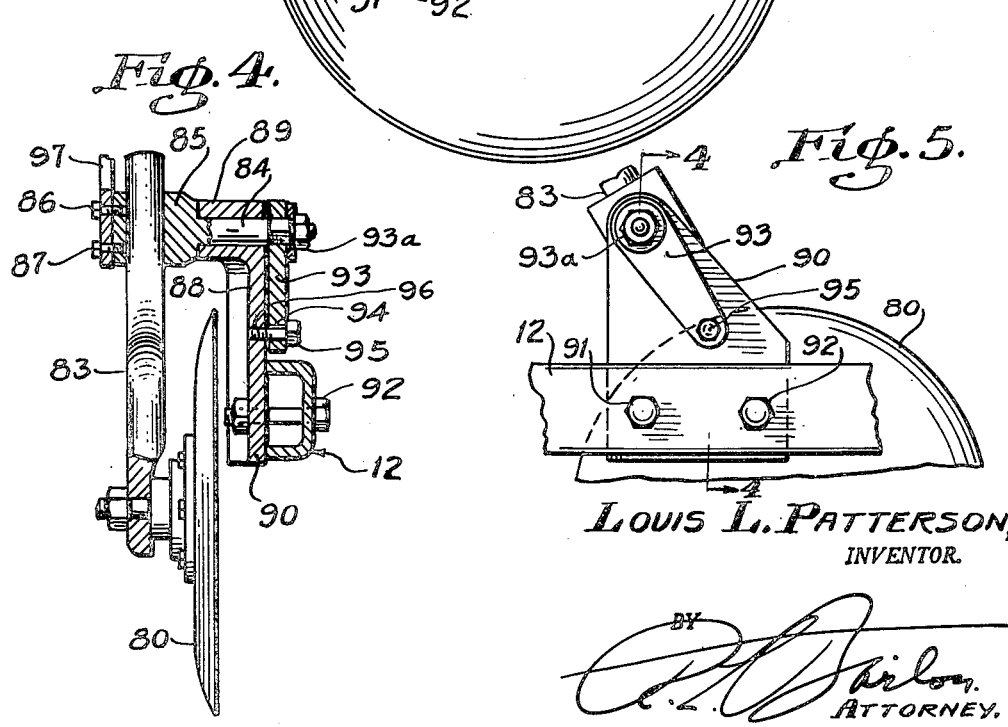

Patented Apr. 21, 1953

2,635,516

UNITED STATES PATENT OFFICE 2,635,516

PATH-LEVELING MEANS FOR THE WHEELS OF WHEEL-MOUNTED PLOWS

Louis L. Patterson, Los Angeles, Calif.

Application November 19, 1946, Serial No. 710,829

1 Claim. (Cl. 97—47)

This invention relates to a path-leveling device for the wheels of wheel-mounted plows.

This invention is more particularly intended to be an improvement upon the plow structure described and claimed in my copending application for United States patent on Rotary Power-Driven Plow Assembly, Serial No. 641,019, filed January 14, 1946, which matured in Patent No. 2,554,498 dated May 29, 1951. However, the present invention, as hereinafter claimed, is not limited to association with the plow structure of said application, but, broadly considered, is also applicable to other types of wheel plows.

In operating the wheel-mounted type of plow supra upon fields made uneven by furrows or small irrigating ditches which cross the path of the plow, plowing of uneven depths has resulted because of the fact that when the wheels are elevated above normal level, by passing over elevated ground, the plowing means is also raised above normal plowing depth.

It is an object of this invention to overcome the aforesaid defect by providing a path-leveling attachment ahead of the advancing wheels of the plow so that said wheels will travel along a substantially level path and as a result will maintain the soil-plowing part or parts at substantially an equal depth below the surface of the ground.

In the operation of the plow structure described and claimed in said copending application over fields which have previously been furrowed out to aid in growing crops, thus causing ridges and hillocks, it has been found that, in crossing over such ridges or hillocks, and also in traversing small irrigating ditches, because of the wheels of the plow following such uneven ground surfaces and in so doing dropping into dips or running over raised areas, the cutter assembly of the plow has been caused to plow at an uneven depth. Therefore the need has become apparent for designing automatically to channel away the tops of the ridges or hillocks so that a substantially level path would be provided for each advancing wheel, preventing the wheels from sometimes lifting the cutting assembly out of the ground and/or too close to its surface.

A more specific object of the invention is to provide a mounting means for the wheel-path-leveling means whereby, when the plow proper is moved out of engagement with the soil, said path-leveling means will automatically be moved to an inoperative position. The device provided by this invention, therefore, does not put an undue strain (which might cause breakage) upon the plowing coulters when the plow is being backed or turned. But when a plow of the kind described in my copending application drops into the ground the rear end of the plow frame, using the wheel axles as a fulcrum, elevates the front end of said frame which is so linked to the path-leveling members as to lower them again to their operative positions.

Another object of the invention is to provide means for adjusting the ground leveling means to an inoperative position when plowing level ground.

Other objects, advantages and features of invention will hereinafter appear.

Referring to the accompanying drawings, which illustrate a preferred, already tested, embodiment of the invention, Fig. 1 is a longitudinal vertical section taken on line I—I of Fig. 2. In this view front and rear portions of the structure are broken away in order to contract the length of the view. Dotted lines indicate operative positions and full lines inoperative positions of the structure.

Fig. 3 is an enlarged, fragmental perspective view of the portion of a two-wheeled plow equipped with the device in advance of the plow's wheels.

Fig. 4 is a vertical section of the device on line 4—4 of Fig. 5.

Fig. 5 is a side elevation thereof looking at the right hand side of a portion of the structure shown in Fig. 4. Figs. 4 and 5 are on the same scale as Fig. 3, and in said Figs. 4 and 5 the coulter is elevated to a fixedly held inoperative position.

Figure 1:
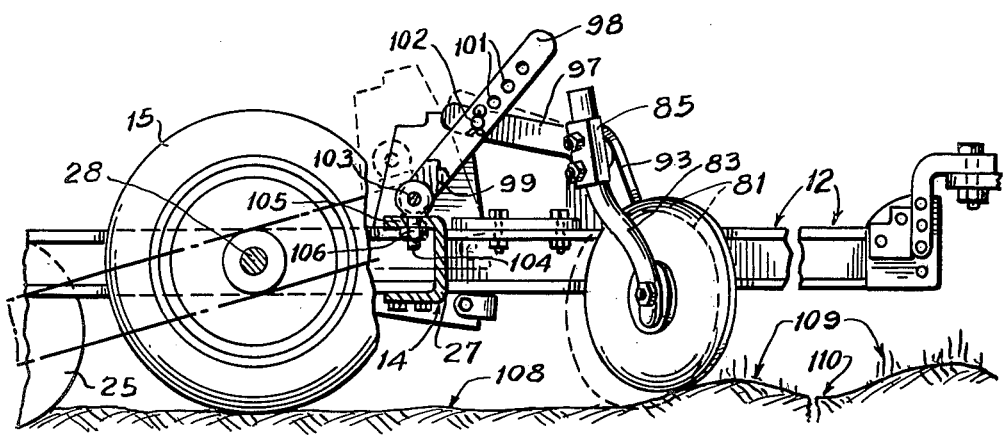

For the sake of clarity in describing the structure which is added by the present invention to the aforesaid implement described in the aforesaid copending application, duplicate reference numbers will be used in describing parts common to the two inventions.

Referring in detail to the several views of the drawings, and particularly to Figs. 3 to 5 inclusive, the ground-leveling means, which is mounted upon the chassis 14 in a forward relation to the wheels 15, comprises a pair of converging coulters 80 and 81.

Each of said coulters is provided with identical mounting means. Therefore a detailed description of the mounting means for one coulter will suffice for both. Each of said coulters is rotatably mounted upon an arm 83, in turn mounted for longitudinal and rotational adjustment upon a stub shaft 84 the latter having an enlarged head 85 in which the free end of the arm 83 is adjustably mounted. Said arm 83 is shown curved in such a manner as to impart a more advantageous position at its lower end. A pair of clamping screws 86 and 87 is provided to adjustably maintain the coulter in its selected rotational adjustment as well as to aid in adjusting the coulter in the proper level in relation to the ground being leveled, as well as to maintain it in the desired rotational position to regulate the width of the path over the soil formed thereby.

A trunnion bracket 88 has a tubular bearing portion 89 in which said stub shaft 84 is mounted for turnable adjustment. Supporting limb 90 of said bracket is attached by bolts 91 and 92 to one or the other of the side limbs of the V-shaped drawbar 12 detailed description of which will be found in my aforesaid copending application. Said stub shaft 84 projects sufficiently far beyond the outer side face of the limb 90 to provide a mounting means for an arm 93 and the securing nut 93a, said arm being provided at its free end with an aperture 94 through which to extend a cap screw 95, said cap screw screwing into an aperture 96 located in the mounting limb 90 of the bracket 88 as shown in Fig. 3.

The protruding end of the stub shaft 84 upon which the arm 93 is mounted is square shouldered and the latter arm is correspondingly apertured to fit thereover so that, when it is desired to adjust the coulters 80 and 81 to their inoperative positions, upon turning the arm 93 from the position shown in Fig. 3 to that of Fig. 5, applying the screw 95 will maintain the coulter at the desired times in the inoperative position.

To the enlarged end portion 85 of the stub shaft 84 is rigidly fastened by welding or otherwise one end of an arm 97, the opposite end of said arm being adjustably mounted between strap metal bars 98 and 99 whose outer end portions are connected by a spacer 100 welded between them. Along the length of said bars are pairs of holes 101 to receive a fastening pin 102 to vary the angular adjustment of arm 83, thus providing for the vertical adjustment of the coulter. The attached end portions of said strap metal bars 98 and 99 are pivotally connected by means of a bolt 103 to the eye portion of the eyebolt 104, the threaded end portion of said eyebolt extending through the upper flange 105 of the channel shaped front cross-piece 27 of the chassis 14 of the plowing implement. The threaded portion of the eye-bolt 104 is secured within said flange 105 of said cross-piece, by means of a nut 106.

From the description of the coulter mounting means already given it will be obvious how the coulter-carrying arms 83 may be secured at various heights in relation to the diametrically enlarged part 85 of the stub shaft 84, and how said stub shaft itself may be turnably adjusted and then fixedly secured in the adjusted position as shown in Fig. 5. The two adjustments just mentioned are manually effected. The chassis 14 is provided with outer side bars 33' which afford the outer bearings for the axles 28 of the ground wheels 15, and with inner side bars 34 forming the inner bearings of said axles. Said bearings are all located in the midlength portions of said bars. Therefore, (provided the screws 95 have been removed from the holes 94 and 96, as shown in Fig. 3), when the plow blade assembly 25 (see Fig. 1) enters the soil, as it does when the power take-off connection 16 (see Fig. 2) transmits driving power to said plow assembly through the gearing 19, the lowering of said plow assembly located rearwardly of said bearings raises the chassis cross bar 27 located forwardly of them, and when said plow assembly leaves the soil it tilts said chassis reversely and lowers said crossbar.

Figure 2:
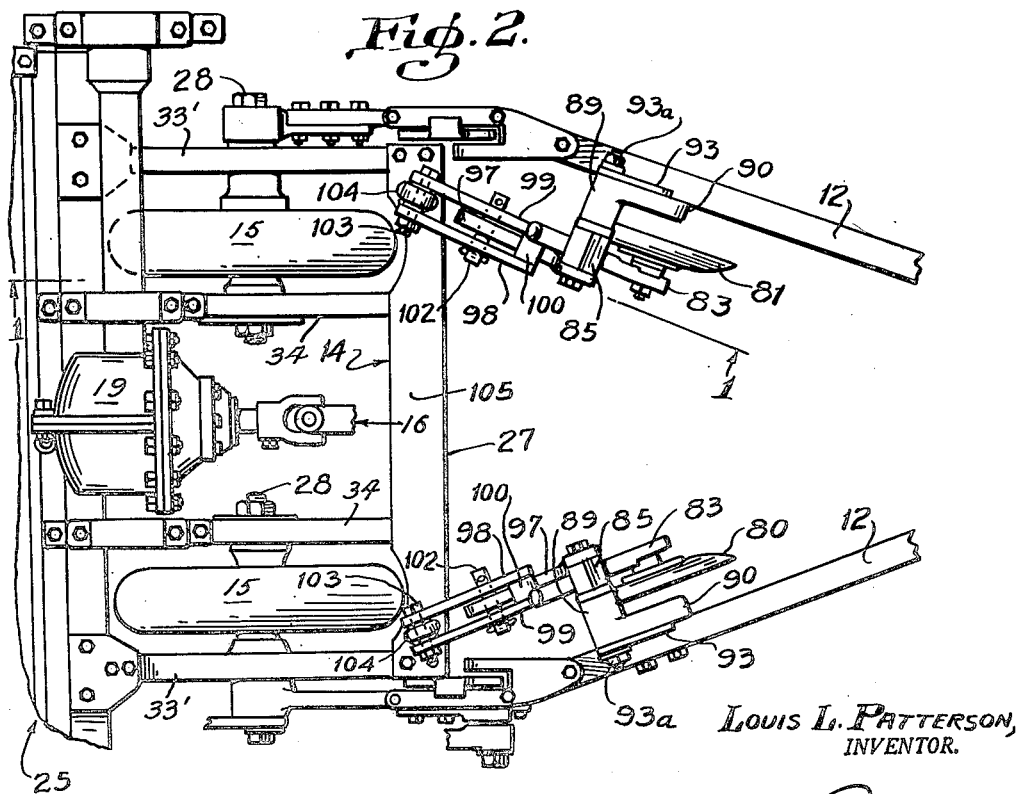
Fig. 2 is a plan view of the structure shown in Fig. 1, parts being omitted.

In Fig. 1 is shown, by dotted lines, the position which the cutter assembly assumes in the plowing operation. The reason for the tilting from the full line to the dotted line position has been stated in my aforesaid co-pending application. But, in order to avoid any misunderstanding of the operation in the present application, an amplification of what has already been stated about the operation will be given now.

When the power take-off, hitched to the member 12, is put into operation, the rotary cutter assembly begins to rotate and causes the trailing edges of the cutter blades to enter the soil to the depth indicated by the dotted line position in Fig. 1. To maintain this cutting depth and the relationship between the positions of the axes of the ground wheels and the axis of the cutter assembly, it is necessary to maintain a level condition of the earth in advance of the ground wheels. In order to do this the coulters 81 are provided, and when the chassis frame is tilted to the aforesaid plowing position, the crosspiece 27, carrying the upstanding paired bars 98 and 99 is raised and consequently the arms 97 are elevated to the dotted line position of Fig. 1, in turn swinging downwardly about the fixed pivot 84 (see Fig. 4) as a fulcrum, the coulter assembly to the dotted line position of Fig. 1, to rest on the level earth 108 to remove the hillocks 109, which are shown separated by and intervening depression 110.

If the soil is level it may be desirable at all times to maintain the coulter assemblies above the surface of the ground. This may be done by removing the already mentioned fastening pins 102 and then placing the screw 95 into the position shown in Figs. 4 and 5.

I claim:

In a plow structure having a supporting wheel at each side thereof and a chassis supported by said wheels to tilt vertically about an axis common to said wheels and adapted to trail plowing means rearwardly of said axis, a drawbar structure to connect said chassis to a tractor, a soil-moving means, mounting means swingably supporting said soil-moving means upon said drawbar in advance of each of said wheels to level a path for each said wheel as said plowing means advances, and means operatively connecting said soil-moving means with said chassis so that when said plowing means is raised to an inoperative position, said soil-moving means is automatically disengaged from the ground.

LOUIS L. PATTERSON.

References Cited in the file of this patent

UNITED STATES PATENTS

| Number | Name | Date |
|---|---|---|
| 520,905 | Swickard | June 5, 1894 |
| 708,405 | Robinson | Sept. 2, 1902 |
| 856,200 | Allin | June 11, 1907 |
| 941,252 | Hightower | Nov. 23, 1909 |
| 1,220,449 | Patterson | Mar. 27, 1917 |
| 1,907,842 | Lewison | May 9, 1933 |
| 2,179,793 | Lewison | Nov. 14, 1939 |
| 2,277,880 | Noble | Mar. 31, 1942 |
| 2,347,373 | Silver | Apr. 25, 1944 |
| 2,348,910 | Kadz | May 16, 1944 |
| 2,430,434 | Rutter | Nov. 4, 1947 |